US012807533B2

(12) United States Patent
Erdal et al.

(10) Patent No.: US 12,807,533 B2
(45) Date of Patent: Nov. 24, 2026

(54) MORTAR MIXTURE WHICH REDUCES CRACK FORMATION

(71) Applicant: KORDSA TEKNIK TEKSTIL A.S., Kocaeli (TR)

(72) Inventors: Burak Erdal, Kocaeli (TR); Ugur Alparslan, Kocaeli (TR)

(73) Assignee: AFYON CIMENTO SANAYI TURK ANONIM SIRKETI, Istanbul (TR)

( * ) Notice: Subject to any disclaimer, the term of this patent is extended or adjusted under 35 U.S.C. 154(b) by 666 days.

(21) Appl. No.: 18/266,811

(22) PCT Filed: Nov. 5, 2021

(86) PCT No.: PCT/TR2021/051148
§ 371 (c)(1),
(2) Date: Jun. 13, 2023

(87) PCT Pub. No.: WO2022/132084
PCT Pub. Date: Jun. 23, 2022

(65) Prior Publication Data

US 2024/0051870 A1 Feb. 15, 2024

(30) Foreign Application Priority Data

Dec. 14, 2020 (TR) ................................ 2020/20410

(51) Int. Cl.

| | |
|---|---|
| ***C04B 14/06*** | (2006.01) |
| ***C04B 16/06*** | (2006.01) |
| ***C04B 28/02*** | (2006.01) |
| *C04B 111/00* | (2006.01) |
| *C04B 111/34* | (2006.01) |

(52) U.S. Cl.
CPC .......... *C04B 16/0683* (2013.01); *C04B 14/06* (2013.01); *C04B 28/02* (2013.01); *C04B 2111/00508* (2013.01); *C04B 2111/343* (2013.01)

(58) Field of Classification Search
CPC ..... C04B 16/0683; C04B 14/06; C04B 28/02; C04B 2111/00508; C04B 2111/343; C04B 28/04; C04B 2111/00758
USPC .............................................................. 524/5
See application file for complete search history.

(56) References Cited

U.S. PATENT DOCUMENTS 4,381,640 A * 5/1983 Chakravarti ........... D02G 3/404 523/222
9,284,664 B2 3/2016 Bassetti et al.
9,802,865 B1 * 10/2017 Chau ....................... C04B 22/06
2013/0139731 A1 * 6/2013 De Sequeira Serra Nunes ........... C04B 7/02 106/735

FOREIGN PATENT DOCUMENTS

| | | | | |
|---|---|---|---|---|
| CN | 110981499 A | | 4/2020 | |
| EP | 3842400 A1 | * | 6/2021 | ............. C04B 28/04 |
| KR | 101187320 B1 | | 10/2012 | |
| KR | 20200011117 A | | 2/2020 | |

* cited by examiner

*Primary Examiner* — Hannah J Pak
(74) *Attorney, Agent, or Firm* — Bayramoglu Law Offices LLC

(57) ABSTRACT

A mortar mixture reduces crack formation by using micro-fibers in pool plasters in order to increase flexural and compressive strength. A waterproof fiber reinforced mortar mixture reduces crack formation by increasing the flexural and compressive strength of pool plasters. By means of the fiber reinforced mortar mixture, workmanship errors (water added more than required due to weighing the material wrong, surface finishing, etc.) and adverse effects due to the external environment (extremely hot and/or windy weather) are minimized.

5 Claims, 1 Drawing Sheet

MORTAR MIXTURE WHICH REDUCES CRACK FORMATION

CROSS REFERENCE TO THE RELATED APPLICATIONS

This application is the national phase entry of International Application No. PCT/TR2021/051148, filed on Nov. 5, 2021, which is based upon and claims priority to Turkish Patent Application No. 2020/20410, filed on Dec. 14, 2020, the entire contents of which are incorporated herein by reference.

TECHNICAL FIELD

The present invention relates to a mortar mixture which reduces crack formation by using microfibers in pool plasters in order to increase flexural and compressive strength.

BACKGROUND

The polymer fibers used in the concrete and mortar are divided into 2 groups:

1. Micro fibers; defining the fibers with equivalent diameter less than or equal to 0.3 mm.
2. Macro fibers; defining the fibers with equivalent diameter greater than 0.3 mm.

The macro fibers used within the concrete and mortar are generally used in order to increase crack resistance and energy absorption capacity of the concrete/mortar. On the other hand, microfibers restrict the plastic and drying shrinkages occurring in the mortar. It reduces the water bleeding in the mortar, thereby ensuring that the fresh mortar settles better and is homogeneously distributed in the mortar, enabling the concrete pieces to adhere. Microfibers increase the cohesion between aggregate-cement-chemical and mineral additives. Efficient crack control and passive fire resistance are achieved in their use of 0.01%-3% (138 gr/m$^3$-41.4 kg/m$^3$) by volume. Generally the fields of use of microfibers are ground concretes, coating concretes (screed, topping), shotcrete and mortar applications.

The pool structure is formed with different materials and different applications step by step. After the completion of the steps after the excavation of the determined pool area, the plastering process is carried out. Plastering is an application which forms the main body of the pool. The plastering process, which provides the balance of the pool structure, is specially prepared with special sand mortar. The construction process includes horizontal and circular applications.

Plastering applied to the body of the pool prevents slipping of the wall and other materials to be applied in the foundation. In order for all the operations required to be performed thereon to be balanced and solid, the plaster must fully adhere. For this, it is necessary to use plaster material which does not have the possibility of abrasion when it comes in contact with water. The stages to be considered in general in the application of plaster material are the following operations:

Application according to the shape of the pool,

Smoothing the wall and ground roughness,

Tightening or closing the pool area with horizontal application technique.

The above mentioned processes increase the durability of the pool in preliminary plan-projects. For this reason, plaster material and plastering technique are among the important processes in pool design. Furthermore, it includes the implementation phase that ensures the long-term use of the pool project.

After the pool casting, the roughness repairing process showing the pool foundation land is plastering. Flat plastering process, which affects the general structure of the pool, offers a better quality coating when carried out horizontally. The mixture of the material is of great importance for the construction of pool plaster.

In the current art, the content of pool plaster consists of white cement, aggregate (sand) and chemical additives. The bending strength and crack resistance of plain mortar create problems in applications. Cracks occur in applications due to the heat released as a result of cement hydration. In general, when no reinforcement members are used, this situation brings along weaknesses and cracks at an early age, and thus concrete plaster layers with shorter lives are formed. When the said problems are combined with adverse outdoor conditions and/or defects caused by inadequate-unqualified workmanship, the problems experienced are tried to be overcome only by reconstruction.

In the current art, the early setting time of the mortar is adjusted with the chemicals and additives used in the pool plaster mortar and it is applied by spraying in this way. However, during the application of the mortar, crack formation occurs due to the heat resulting from the hydration of the cement.

During the search performed on the state of the art, the application document no KR20200011117A was found. The said document relates to a method which ensures the waterproofness of the pool. The document discloses that a fiberglass mesh is used over the waterproof layer built on the wall of the pool.

SUMMARY

The main objective of the present invention is to provide a waterproof fiber reinforced mortar mixture which reduces crack formation by increasing the bending and compressive strength of pool plasters. By means of the fiber reinforced mortar mixture, workmanship errors (water added more than required due to weighing the material wrong, surface finishing, etc.) and adverse effects due to the external environment (extremely hot and/or windy weather) are minimized.

BRIEF DESCRIPTION OF THE DRAWINGS

"A Mortar Mixture Which Reduces Crack Formation" developed in order to fulfill the objectives of the present invention is illustrated in the accompanying figures, in which.

DETAILED DESCRIPTION OF THE EMBODIMENTS

Figure 1:
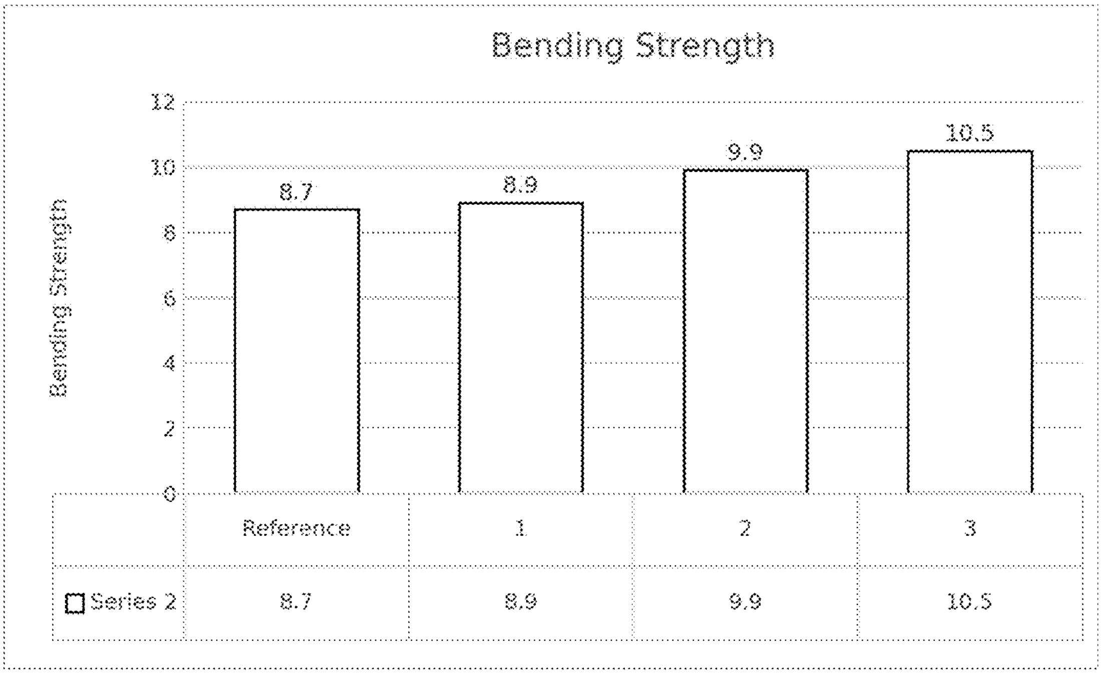
FIG. 1. Graphical representation showing the bending strength according to the result of the test and analysis carried out by using polyethylene terephthalate (PET) microfiber.

The mortar mixture developed within the scope of the invention to be used in pool plasters comprises water, dry mix and polymer fiber. The said dry mix comprises white cement/grey cement and sand/aggregate.

In the mortar mixture of the present invention which reduces the crack formation; at least one polymer fiber selected from a group comprising polyethylene terephthalate, polypropylene, polyester, polyamide, polyaramid, polyethylene naphthalate, natural fibers (cellulosic, glass, basalt), steel fiber and mixtures thereof can be used as polymer fiber. The polymer fiber is preferably polyethylene terephthalate (PET) microfiber.

TABLE 1

| Components of the mortar mixture according to the invention | Preferred amount by weight (kg) |
|---|---|
| Water | 353 |
| Dry mix | 1600 |
| Polymer fiber | 0.1, 0.15, 0.2 (depending on the weight of the dry mix) |

PET microfibers are used homogeneously in the mortar mixture. Therefore, cohesion is provided by establishing a bridge in the mortar mixture. The said PET microfibers can be added to the mortar mixture on site or at the packaging stage. The diameter of PET microfibers used in the invention is in the range of 5-35 microns. The fiber use in the mortar mixture is in the range of 0.01%-3% by volume, the specific weight of PET fiber being 1380 kg/m$^3$, the range of the amount to be used for 1 m$^3$ of mortar is as follows:

0.01% fiber ratio→138 gr/m$^3$

3% fiber ratio→41.4 kg/m$^3$

The tensile strength of PET microfibers is 300-1200 MPa, the elongation amount of PET microfibers is 5%-35%, their melting temperature is 235-275° C., dtex value is 350-9000 dtex, and the length is preferably 0.5 mm-100 mm. Finish oil on PET microfibers is between 0.02%-3% maximum. Finish oil is a raw material used in the pet fiber production process. Finish oil eliminates the electrostatic force on the fiber. It enables that the fibers do not adhere to each other. Finish oil enables more homogeneous distribution of fibers in the mortar.

PET microfibers in the mortar mixture are fire resistant. In the mortar mixture, the breaking/spalling among the components is reduced thanks to the PET microfibers. In case of application of the mortar mixture according to the invention, it reduces the amount of rebound between 30%-90%. Apart from the fiber application, applications which provide crack control and strength can also be provided with textile reinforcements. Addition of fibers also minimizes workmanship errors (water added more than required due to weighing the material wrong, surface finishing, etc.) and adverse effects due to the external environment (extremely hot and/or windy weather).

The data regarding the tests carried out to prove the effectiveness of a mortar mixture according to the present invention which reduces crack formation are given below. The said test and analysis results are presented for information purposes only and do not have any limiting meaning.

The table below shows the fiber amounts used for 1600 grams of dry mix (white cement and sand) and 353 grams of water; in field conditions, small scale samples were used in studies based on the mortar mixture comprising a dry mix of 100 kg formed of blends and water in ratio of 15%-45% (this range is followed for reasons such as weather conditions, variability of cement-aggregate) of the total dry mix.

TABLE 2

Experiment and Analysis Results

| FIBER STUDY WITH POOL PLASTER | | | | | | | | |
|---|---|---|---|---|---|---|---|---|
| Study no | Water | Dry mix | PET fiber (6 mm) % by weight of dry mix | Spreading properties | Sample numbers and information | Observation notes | Bending strengths 7$^{th}$ day | Compressive Strength 7$^{th}$ day |
| Reference | 353 grams | 1600 grams | — | Maximum spread (25 cm) was achieved in 16 hits. | 9 pieces 4 cm × 4 cm × 16 cm prism | Bleeding occurred after placing in the mold. | 8.7 | 29.2 |
| 1 | 353 grams | 1600 grams | 0.1 | Maximum spread (25 cm) achieved at 15 seconds and 25 hits. | 9 pieces 4 cm × 4 cm × 16 cm prism | Bleeding occurred after placing in the mold. | 8.9 | 29.3 |
| 2 | 353 grams | 1600 grams | 0.15 | 23 cm spread was achieved in 15 seconds and 25 hits. | 9 pieces 4 cm × 4 cm × 16 cm prism | Bleeding was not observed. | 9.9 | 30.6 |
| 3 | 353 grams | 1600 grams | 0.2 | 22 cm spread was achieved in 15 seconds and 25 hits. | 9 pieces 4 cm × 4 cm × 16 cm prism | Bleeding was not observed. | 10.5 | 31.8 |

Figure 2:
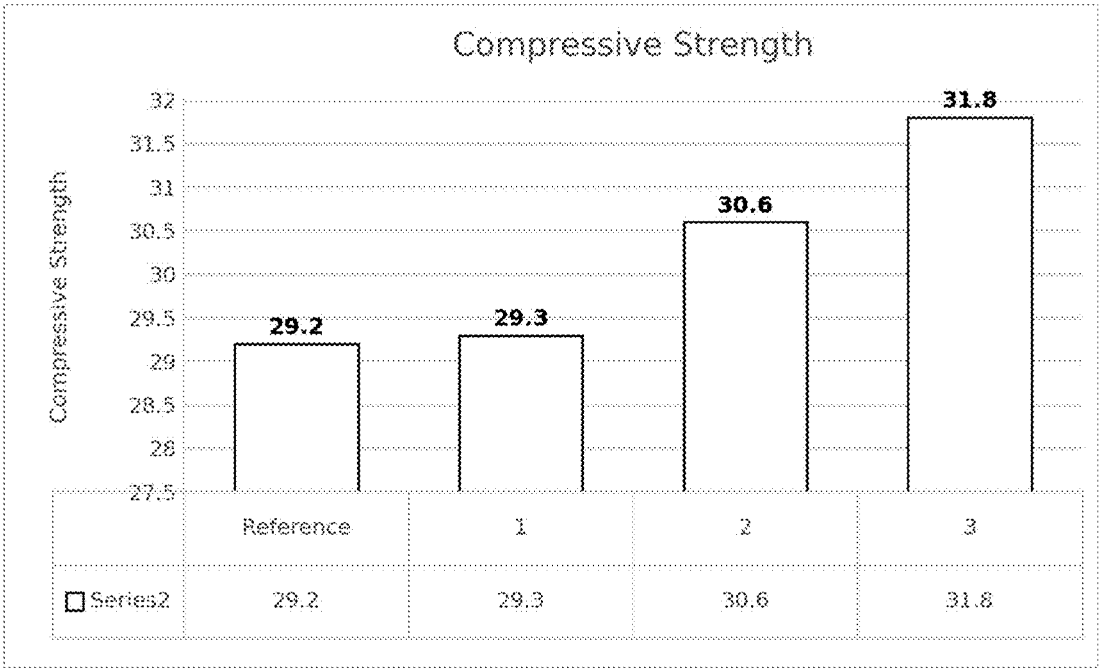
FIG. 2. Graphical representation showing the compressive strength according to the result of the test and analysis carried out by using polyethylene terephthalate (PET) microfiber.

With the mortar mixture according to the present invention, as seen in FIG. 1 and FIG. 2, with the use of PET microfiber, the 7$^{th}$ day bending strength has increased up to 21%, and the compressive strength has increased up to 9% compared to the reference mortar mixture (mortar mixture without PET fiber).

What is claimed is:

1. A mortar mixture for use in pool plasters, comprising:

water, dry mix comprising white cement/grey cement and sand/aggregate, and polymer fiber, wherein the polymer fiber comprises polyethylene terephthalate (PET) having a diameter of 5-35 microns and a length of 0.5 mm-100 mm, wherein the PET is a PET microfiber.

2. The mortar mixture according to claim 1, further comprising at least one polymer fiber selected from the group consisting of polypropylene, polyester, polyamide, polyaramid, polyethylene naphthalate, cellulosic fiber, and mixtures thereof.

3. The mortar mixture according to claim 1, wherein the polymer fiber used in the mortar mixture is in a range of 0.01%-3% by volume.

4. The mortar mixture according to claim 2, wherein the polymer fiber used in the mortar mixture is in a range of 0.01%-3% by volume.

5. The mortar mixture according to claim 1, wherein the PET microfiber length is 6 mm.

* * * * *